US010915616B2

(12) United States Patent
Shiga

(10) Patent No.: US 10,915,616 B2
(45) Date of Patent: Feb. 9, 2021

(54) IC MODULE, IC CARD, AND VERIFICATION DEVICE

(71) Applicants: Kabushiki Kaisha Toshiba, Minato-ku (JP); Toshiba Infrastructure Systems & Solutions Corporation, Kawasaki (JP)

(72) Inventor: Akinori Shiga, Kawasaki (JP)

(73) Assignees: Kabushiki Kaisha Toshiba, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 7 days.

(21) Appl. No.: 16/179,303

(22) Filed: Nov. 2, 2018

(65) Prior Publication Data

US 2019/0073466 A1 Mar. 7, 2019

Related U.S. Application Data

(63) Continuation of application No. PCT/JP2017/024151, filed on Jun. 30, 2017.

(30) Foreign Application Priority Data

Jul. 15, 2016 (JP) ................................ 2016-140699

(51) Int. Cl.
*G06F 21/31* (2013.01)
*G06F 21/32* (2013.01)
(Continued)

(52) U.S. Cl.
CPC .............. *G06F 21/32* (2013.01); *G06F 21/31* (2013.01); *G06F 21/35* (2013.01); *G06K 9/03* (2013.01);
(Continued)

(58) Field of Classification Search
CPC ...................................................... G06F 21/32
See application file for complete search history.

(56) References Cited

U.S. PATENT DOCUMENTS 5,870,723 A * 2/1999 Pare, Jr. .................. G06F 21/32
705/39
8,396,265 B1 * 3/2013 Ross .................. G06K 9/00214
382/103
(Continued)

FOREIGN PATENT DOCUMENTS

JP 2010-152506 7/2010
JP 2010-286936 12/2010
(Continued)

OTHER PUBLICATIONS

International Search Report dated Sep. 19, 2017 in PCT/JP2017/024151, filed on Jun. 30, 2017.
(Continued)

*Primary Examiner* — Ponnoreay Pich
(74) *Attorney, Agent, or Firm* — Obion, McClelland, Maier & Neustadt, L.L.P.

(57) ABSTRACT

An IC module includes a storage unit, a communications unit, and a processing unit. The storage unit stores reference data. The communications unit receives check data. The processing unit detects a degree of similarity between the reference data and the check data. Furthermore, when the degree of similarity is equal to or larger than a first threshold value, the processing unit determines a verification success, and when the degree of similarity is smaller than the first threshold value, the processing unit determines a verification failure, and updates a verification failure history in a weighted manner according to the degree of similarity.

9 Claims, 5 Drawing Sheets

(51) Int. Cl.
*G06K 9/62* (2006.01)
*G06K 9/03* (2006.01)
*G06F 21/35* (2013.01)
*G06K 9/00* (2006.01)

(52) U.S. Cl.
CPC ....... *G06K 9/6215* (2013.01); *G06K 9/00087* (2013.01)

(56) References Cited

U.S. PATENT DOCUMENTS

| | | | | |
|---|---|---|---|---|
| 2004/0233930 | A1* | 11/2004 | Colby, Jr. | H04W 88/02 370/464 |
| 2006/0206724 | A1* | 9/2006 | Schaufele | G06F 21/32 713/186 |
| 2008/0237333 | A1* | 10/2008 | Fukuda | G06F 21/77 235/375 |
| 2009/0259850 | A1* | 10/2009 | Ishibashi | H04L 9/3273 713/169 |
| 2009/0260078 | A1* | 10/2009 | Nakazawa | G06F 21/31 726/19 |
| 2010/0117791 | A1* | 5/2010 | Inoue | G06F 21/32 340/5.52 |
| 2012/0199653 | A1* | 8/2012 | Wenzel | G07C 9/27 235/382 |
| 2015/0067822 | A1* | 3/2015 | Randall | G10L 17/04 726/17 |
| 2015/0349959 | A1 | 12/2015 | Marciniak | |

FOREIGN PATENT DOCUMENTS

| | | |
|---|---|---|
| JP | 2015-148952 | 8/2015 |
| JP | 2016-57890 | 4/2016 |
| TW | 200411572 | 7/2004 |
| TW | 200634657 | 10/2006 |
| WO | WO 2006/055575 A2 | 5/2006 |

OTHER PUBLICATIONS

Extended European Search Report dated Jan. 13, 2020 in Patent Application No. 17827451.0, 8 pages.

* cited by examiner

FIG. 4

| Degree of similarity (S) | Update history of failure history (cumulative number of times of failure) corresponding to degree of similarity |
|---|---|
| | Process |
| 90% ≦ S | Equal to or more than first threshold value (90%) -> Verification success Reset failure history (Cumulative number of times of failure) |
| 70% ≦ S <90% (First condition) | Less than first threshold value (90%) -> Verification failure Update history in a first weighted manner (e.g. cumulative number of times of failure + 1) |
| 30% ≦ S <70% (Second condition) | Less than first threshold value (90%) -> Verification failure Update history in a second weighted manner (e.g. cumulative number of times of failure + 2) |
| 0% ≦ S <30% (Third condition) | Less than first threshold value (90%) -> Verifiction failure Update history in a third weighted manner (e.g. cumulative number of times of failure + 3) |

| Contents of response | SW1 | SW2 |
|---|---|---|
| Normally end | 0x90 | 0x00 |
| Verification mismatch | 0x63 | 0x00 |
| Verification mismatch and remaining number of times n | 0x63 | 0xcn |

IC MODULE, IC CARD, AND VERIFICATION DEVICE

CROSS-REFERENCE TO RELATED APPLICATIONS

This application is based upon and claims the benefit of priority from Japanese Patent Application No. 2016-140699 filed Jul. 15, 2016, the entire contents of which are incorporated herein by reference. This application is a continuation application of International Application No. PCT/JP2017/024151 filed on Jun. 30, 2017.

FIELD

Embodiments of a present invention relate to an IC (Integrated Circuit) module, an IC card, and a verification device.

BACKGROUND

A VERIFY command is prescribed in ISO/IEC 7816-4 which is an international standard of contact type IC card. According to this regulation, if check data transmitted to an IC card from a terminal did not coincide with reference data stored in the IC card, the IC card may record a failure of verification. For example, the IC card can limit the number of times of usage of the reference data on the basis of a record of the failure of verification. However, this regulation does not specify how to limit the number of times of use.

In the case of verification by PIN (Personal Identification Number) as an example, an IC card holds an upper limit of the number of times of usage of reference data, and when the check data did not coincide with the reference data, the IC card counts up the cumulative number of times of failure by 1 as for verification failure. The IC card compares the upper limit of the number of times of usage of reference data with the cumulative number of times of failure, and limits the number of times of usage of the reference data.

PRIOR ART LITERATURE

Patent Literature

[Patent literature 1] Japanese patent application disclosure No. 2016-57890

SUMMARY OF THE INVENTION

Subject to be Solved by the Invention

There are not only a case where the success or failure of the verification is determined by perfect coincidence like verification by PIN, but also a case where the success or failure of the verification may be determined by the degree of similarity like biometric authentication. The meaning of verification failure differs between the former and the latter.

In the latter case, that is, when the success or failure of the verification is determined by the degree of similarity, it is considered that the degree of similarity at the time of verification failure by a correct verification person (person himself/herself) and the degree of similarity at the time of verification failure by an illegal person are different. Thus, there is a demand for a technique for distinguishing and managing verification failures according to the degree of similarity.

An object of the present invention is to provide an IC module, an IC card, and a verification device capable of updating a verification failure history in a weighted manner according to the degree of similarity.

Means for Solving the Subject

An IC module of an embodiment includes a storage unit, a communication unit, and a processing unit. The storage unit stores reference data. The communication unit receives check data. The processing unit detects a degree of similarity between the reference data and the check data. Furthermore, the processing unit determines a verification success when the degree of similarity is equal to or larger than a first threshold value, and determine a verification failure when the degree of similarity is smaller than the first threshold value, and updates the verification failure history in a weighted manner according to the degree of similarity.

BRIEF EXPLANATION OF THE DRAWINGS

FIG. 4 is a diagram showing an example of an update process of a verification failure history (the cumulative number of times of failure) according to a degree of similarity by the IC card according to the embodiment.

EMBODIMENT TO PRACTIS THE INVENTION

Hereinafter, an embodiment will be described with reference to the drawings.

Figure 1:
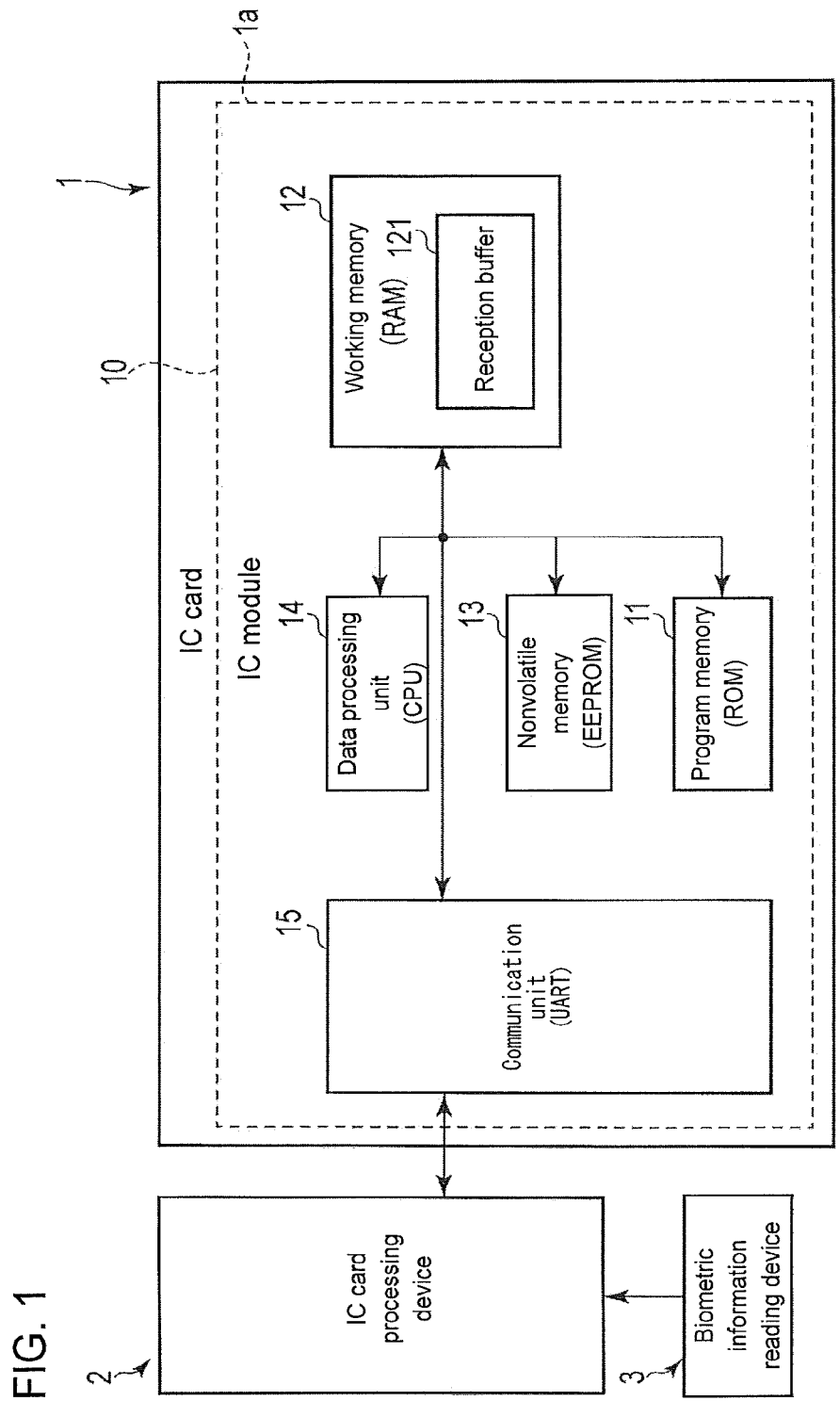
FIG. 1 is a diagram showing an example of a verification system according to an embodiment.

FIG. 1 is a diagram showing an example of a verification system according to the embodiment. As shown in FIG. 1, the verification system includes an IC card 1, an IC card processing device 2 that communicates with an IC card, and a biometric information reading device 3 that reads biometric information. Note that the IC card is also called a smart card.

The biometric information reading device 3 reads the biometric information and transmits check data based on the read biometric information to the IC card processing device 2. For example, the biometric information reading device 3 reads a fingerprint, an iris, a blood vessel pattern, a voiceprint, a signature or the like as the biometric information, and transmits the check data based on the read biometric information to the IC card processing device 2. Further, the biometric information reading device 3 can transmit information indicating a type of the biometric information (check data) (for example, any one of a thumb, forefinger, middle finger, ring finger, or little finger of a right hand or left hand) together with the check data. For example, the biometric information reading device 3 can display a guidance of pressing a right hand thumb against a reading unit, and can output information read from a finger pressed in accordance with the guidance display as check data of the right hand thumb. Alternatively, the biometric information reading device 3 includes a type input unit (for example, a touch panel) of biometric information, receives designation of the right hand thumb via the type input unit, and can output the information read from the finger as the check data of the right hand thumb.

The IC card processing device 2 communicates with the IC card 1 in a contact manner or a non-contact manner. The IC card processing device 2 transmits a command to the IC card 1 in accordance with a specific protocol, and reads or rewrites information in the IC card 1. For example, the IC card processing device 2 transmits to the IC card 1 a command including the check data generated based on the biometric information and the type information (identifier) of the check data.

The IC card 1 is a contact type IC card or a non-contact type IC card. In the case of the contact type IC card, the IC card 1 communicates with the IC card processing device (reader writer) 2 in the contact manner. In the case of the non-contact type IC card, the IC card 1 communicates with the IC card processing device 2 in the non-contact manner. It should be noted that the IC card 1 may be a combination type IC card supporting both contact type and non-contact type. In this case, the IC card 1 can communicate with the contact type IC card processing device 2 in the contact manner, and can communicate with the non-contact type IC card processing device 2 in the non-contact manner.

The IC card 1 includes, for example, a plastic card (substrate) 1a and an IC module (IC chip) 10. The IC module 10 includes a program memory (for example, ROM: Read Only Memory) 11, a main memory (for example, RAM: Random Access Memory) 12, a nonvolatile memory (for example, EEPROM (registered trademark): Electrically Erasable and Programmable Read Only Memory) 13, a data processing unit (for example, CPU: Central Processing Unit) 14, and a communication unit (for example, UART: Universal Asynchronous Receiver Transmitter) 15. For example, the main memory 12 includes a reception buffer 121.

The main memory 12 functions as a working memory. The program memory 11 holds an IC card program that is executed by the data processing unit 14. The data processing unit 14 operates on the basis of the IC card program or the like stored in the program memory 11. Further, the IC card 1 holds the command received via the UART 15 in the reception buffer 121. Thereafter, the data processing unit 14 interprets the command held in the reception buffer 121, and executes processing in accordance with the command. For example, the data processing unit 14, on the basis of the received command, reads data stored in the nonvolatile memory 13 or the main memory 12, writes data to the nonvolatile memory 13 or the main memory 12, and transmits a command execution result via the UART 15 (transmits the command execution result to the IC card processing device 2).

Figures 2, 3:
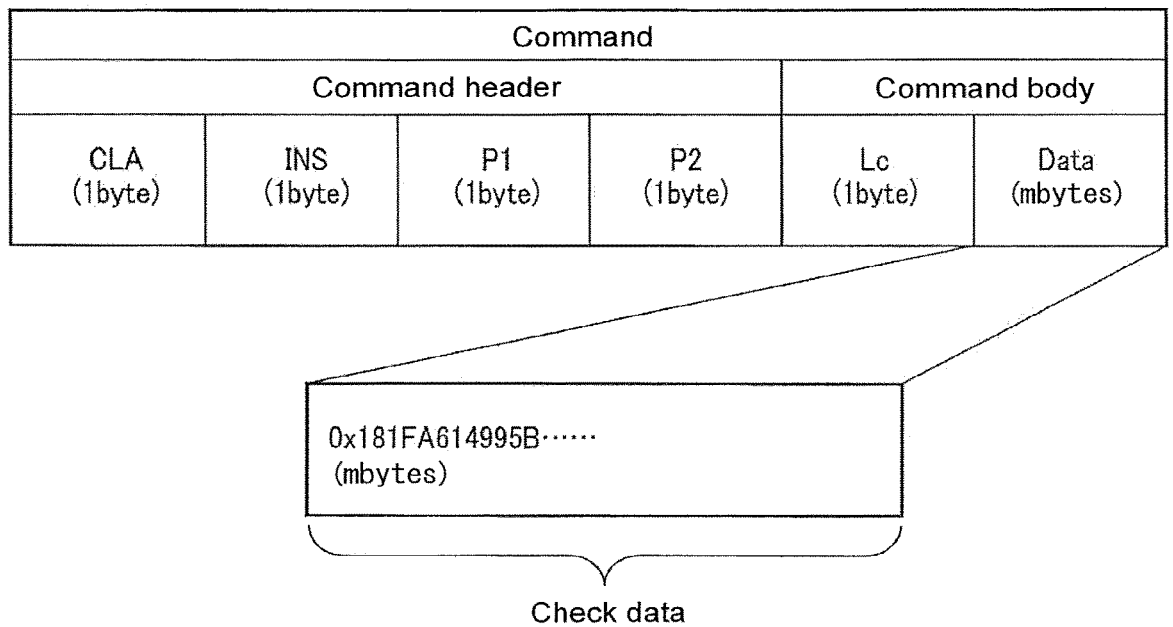
FIG. 2 is a diagram showing an example of a command transmitted to an IC card from an IC card processing device according to the embodiment.
FIG. 3 is a diagram showing an example of verification management information according to the embodiment.

FIG. 2 is a diagram showing an example of a command transmitted from the IC card processing device according to the embodiment to the IC card. As shown in FIG. 2, for example, the command transmitted from the IC card processing device 2 to the IC card 1 is a Command Application Data Unit (C-APDU) format prescribed in ISO/IEC 7816-3. The command includes a command header and a command body. The command header includes CLA (1 Byte) and INS (1 Byte) indicating the type of the command, and P1 (1 Byte) and P2 (1 Byte) indicating a parameter. The command body includes Lc (1 Byte) indicating a length of Data and Data (m Bytes). For example, in the Data part in which Data is stored, the check data generated based on the biometric information of the person himself/herself (an authorized user of the IC card) is stored.

For example, P1 or P2 included in the command includes an identifier, and the identifier indicates a kind of a finger (for example, any one of a thumb, forefinger, middle finger, ring finger, or little finger of a right hand or left hand). For example, when the identifier indicates the thumb of the right hand, the check data of the Data part included in the command indicates the biometric information of the thumb of the right hand.

FIG. 3 is a diagram showing an example of verification management information according to the embodiment. For example, as shown in FIG. 3, the nonvolatile memory 13 holds reference data (first biometric information) generated based on the biometric information of the person himself/herself, the cumulative number of times of failure for each reference data, the upper limit of the number of times of failure (retry condition) for each reference data and the identifier for identifying each reference data. For example, the identifier indicates the type of the finger (any one of a thumb, forefinger, middle finger, ring finger, or little finger of a right hand or left hand). For example, when the identifier indicates the thumb of the right hand, the reference data corresponding to this identifier indicates the biometric information of the thumb of the right hand.

FIG. 4 is a diagram showing an example of a process of updating a verification failure history (the cumulative number of times of failure) according to the degree of similarity by the IC card according to the embodiment. The data processing unit 14 of the IC card 1 compares the check data (the second biometric information) with the reference data (the first biometric information), calculates (detects) the degree of similarity (S) and updates (changes) the verification failure history (for example, the cumulative number of times of failure) according to the calculated degree of similarity.

For example, the data processing unit 14 determines a verification success when the degree of similarity is equal to or larger than a first threshold value (for example, 90%), and determines a verification failure when the degree of similarity is smaller than the first threshold value. Furthermore, when the degree of similarity is smaller than the first threshold value, that is, when the data processing unit 14 determines the verification failure, the data processing unit 14 updates the verification failure history in a weighted manner according to the degree of similarity.

For example, when a first condition that the degree of similarity is smaller than the first threshold value and is equal to or larger than a second threshold value (for example, 70%) that is smaller than the first threshold value is satisfied, the data processing unit 14 updates the verification failure history in a first weighted manner. For example, the data processing unit 14 adds +1 (first value) to the cumulative number of times of failure.

Further, when a second condition that the degree of similarity is smaller than the second threshold value and is equal to or larger than a third threshold value (for example, 30%) that is smaller than the second threshold value is satisfied, the data processing unit 14 updates the verification failure history in a second weighted manner. For example, the data processing unit 14 adds +2 (second value) to the cumulative number of times of failure.

Further, when a third condition that the degree of similarity is smaller than the third threshold value and is equal to or larger than a fourth threshold value (for example, 0%) that is smaller than the third threshold value is satisfied, the data processing unit 14 updates the verification failure history in a third weighted manner. For example, the data processing unit 14 adds +3 (second value) to the cumulative number of times of failure. Alternatively, the data processing unit 14 may add the upper limit of the number of times of failure or the upper limit of the number of times of failure+1 to the cumulative number of times of failure. In this case, when the third condition is satisfied, the cumulative number of times of failure will reach immediately the upper limit of the number of times of failure or the upper limit of the number of times of failure+1.

Note that the first, second, and third values are not limited to +1, +2, +3, respectively, but may be +1, +3, +5, respectively, for example.

For example, it is assumed that the cumulative number of times of failure associated with the first reference data of the first identifier is 0 and the upper limit of the number of times of failure (retry condition) is 5. When the cumulative number of times of failure is 5 or less, a verification retry is permitted, and when it exceeds 5, the verification retry is refused.

When the IC card 1 receives the command (a first time) shown in FIG. 2 and P1 or P2 included in the command indicates a first identifier, the data processing section 14 compares the first check data included in the command (the first time) with the first reference data associated with the first identifier to calculate the degree of similarity. For example, when the second condition is satisfied, the data processing unit 14 adds +2 to the cumulative number of times of failure and updates the cumulative number of times of failure to 2. When the cumulative number of times of failure is 2, it does not exceed 5 that is the upper limit of the number of times of failure, and the retry condition is satisfied. Therefore, the data processing unit 14 allows a verification retry on the basis of the command shown in FIG. 2.

Further, when the IC card 1 receives the command (a second time) shown in FIG. 2 and P1 or P2 included in the command indicates the first identifier, the data processing section 14 compares the first check data included in the command (the second time) with the first reference data associated with the first identifier to calculate the degree of similarity. When the second condition is satisfied, the data processing unit 14 adds +2 to the cumulative number of times of failure and updates the cumulative number of times of failure to 4. When the cumulative number of times of failure is 4, it does not exceed 5 that is the upper limit of the number of times of failure and the retry condition is satisfied. Therefore, the data processing unit 14 allows the verification retry on the basis of the command shown in FIG. 2.

Further, when the IC card 1 receives the command (a third time) shown in FIG. 2 and P1 or P2 included in the command indicates the first identifier, the data processing section 14 compares the first check data included in the command (the third time) with the first reference data associated with the first identifier to calculate the degree of similarity. When the third condition is satisfied, the data processing unit 14 adds +3 to the cumulative number of times of failure, and updates the cumulative number of times of failure to 7. When the cumulative number of times of failure is 7, it exceeds 5 that is the upper limit of the number of times of failure, and the retry condition is not satisfied. Therefore, the data processing unit 14 refuses the verification retry on the basis of the command shown in FIG. 2.

In this manner, by weighting the number of times of failure according to the degree of similarity, it becomes possible to ensure safety according to the degree of similarity. That is, when the degree of similarity is relatively high, the probability of verification by the person himself/herself is relatively high. Accordingly, in this case, convenience is secured without severely limiting the number of times of verification retry. Moreover, when the degree of similarity is relatively low, the probability of verification by the person himself/herself is relatively low. Accordingly, fraud prevention is intended with severely limiting the number of times of verification retry.

Note that, in the case where the command (the second or third time) is received after the first verification failure or the second verification failure, and the verification is successful, the data processing unit 14 resets the verification failure history. That is, 2 or 4 in the cumulative number of times of failure is set to 0.

Further, for example, by setting the upper limit of the number of times of failure associated with the second reference data of the second identifier to 3, or setting the upper limit of the number of times of failure associated with the third reference data of the third identifier to 1, it is also possible to strictly limit the number of times of verification retry and prevent fraud.

Figures 5, 6:
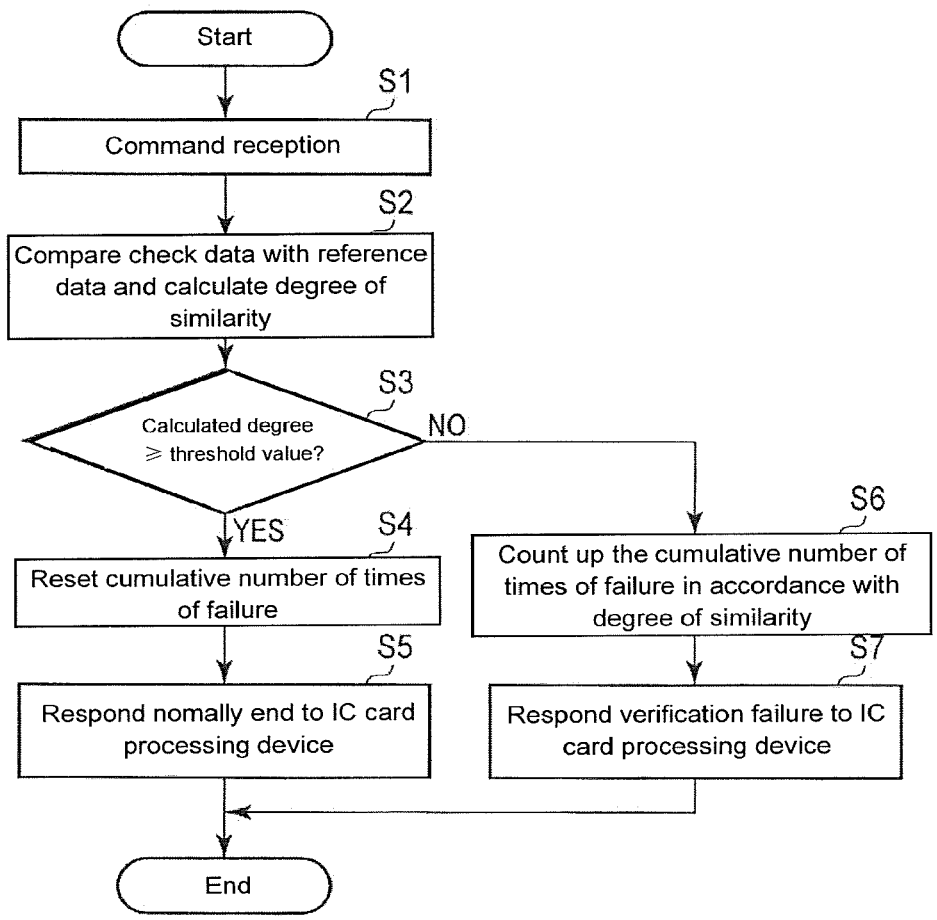
FIG. 5 is a flowchart showing an example of a verification process according to the embodiment.
FIG. 6 is a diagram showing an example of data structure of a response according to the embodiment.

FIG. 5 is a flowchart showing an example of a verification process according to the embodiment.

The IC card 1 receives the command (see FIG. 2) transmitted from the IC card processing device via the communication unit 15 (S1). The IC card 1 stores the received command in the reception buffer 121.

The data processing unit 14 interprets the received command and calculates the degree of similarity between the check data included in the command and the reference data included in the nonvolatile memory 13 (S2). For example, the data processing unit 14 interprets the first identifier from P1 or P2 included in the command, and calculates the degree of similarity between the check data included in the command and the first reference data associated with the first identifier.

When the degree of similarity is equal to or larger than the first threshold value (for example 90%), the data processing unit 14 determines the verification success (S3, YES), resets the cumulative number of times of failure stored in the nonvolatile memory 13 (S4), and transmits a normal end indicating the verification success to the IC card processing device 2 as a response to the received command (S5).

Moreover, when the degree of similarity is smaller than the first threshold value (for example, 90%) (S3, NO), the data processing unit 14 determines the verification failure, counts up the cumulative number of times of failure in a weighted manner according to the degree of similarity (S6), and transmits an abnormal end indicating the verification failure as a response to the received command to the IC card processing unit 2 (S7).

FIG. 6 is a diagram showing an example of a data structure of a response according to the embodiment. As shown in FIG. 6, the response includes status words SW 1 and SW 2. For example, there are a response indicating a normal end, a response indicating verification failure (verification mismatch), and a response indicating verification failure and the remaining number of times n. For example, it is assumed a case where the second condition is satisfied and +2 is added to the cumulative number of times of failure in a second weighted manner, in the verification retry after the first response indicating that the verification failed and the remaining number of times is 4 was transmitted. In this case, after the first response was transmitted, a second response indicating that the verification failed and the remaining number of times is 2 is transmitted. That is, the remaining number of times decreases 2 after one verification retry.

Figure 7:
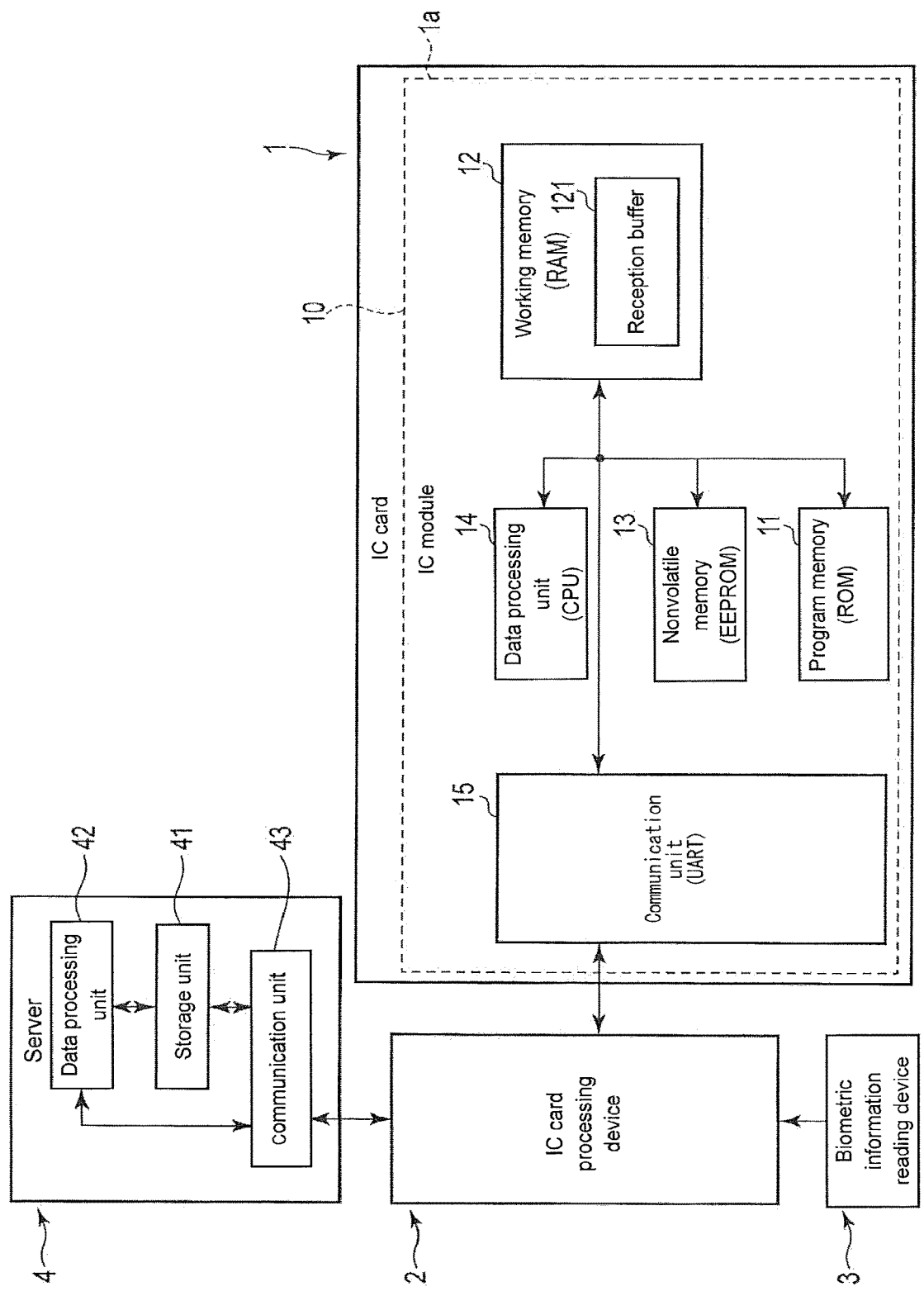
FIG. 7 is a diagram showing another example of the verification system according to the embodiment.

FIG. 7 is a diagram showing another example of the verification system according to the embodiment. As shown in FIG. 7, the verification system includes an IC card 1, an IC card processing device 2 that communicates with the IC card 1, a biometric information reading device 3 that reads biometric information, and a server 4. The server 4 includes a storage unit 41, a data processing unit 42, a communication unit 43, and so on.

Although the verification process by the IC card 1 has been described with reference to FIGS. 1 to 6, the verification process may be executed by the server 4. For example, a program memory 11 or a nonvolatile memory 13 of the IC card 1 holds card identification information. The IC card processing device 2 transmits biometric information and a type of biometric information from the biometric information reading device 3 and the card identification information read from the IC card 1 to the server 4.

The storage unit 41 of the server 4 stores verification management information shown in FIG. 3 in association with the card identification information. The communication unit 43 of the server 4 receives the check data, the type of the check data and the card identification information from the IC card processing device 2, and the data processing unit 42 reads out the verification management information associated with the received card identification information. Further, the data processing unit 42 selects the reference data corresponding to the type of the received check data from the read verification management information, compares the received check data with the selected reference data to calculate (detect) the degree of similarity (S) and updates (changes) the verification failure history (for example, the cumulative number of times of failure) according to the calculated degree of similarity. Updating the verification failure history is as described above. Thus, the verification process may be executed by the server 4 instead of the IC card 1.

The IC card 1 or the server 4 of the present embodiment determines an increment of the cumulative number of times of failure according to the degree of similarity between the check data and the reference data in counting up the cumulative number of times of failure at the time of the verification failure. Causes of verification failure by the correct verification person (person himself/herself) are accidental reasons such as poor physical condition and environment at the time of sensing biometric information. It is presumed that the degree of similarity obtained at the time of verification failure by the correct verification person (person himself/herself) is relatively high. When the degree of similarity is relatively high, the increment of the cumulative number of times of failure is set relatively small. Conversely, it is presumed that the degree of similarity obtained at the time of verification failure by an unauthorized person (another person) is relatively low. When the degree of similarity is relatively low, the increment of the cumulative number of times of failure is set relatively large. This makes it possible to reduce the risk of early arrival at limitation of the number of times of verification when the correct verification person (person himself/herself) failed verification. In addition, for verification by an unauthorized person, security can be improved by allowing the early arrival at limitation of the number of times of verification. That is, it is possible to achieve both convenience and safety.

As described above, according to the present embodiment, it is possible to provide an IC module, an IC card, and a verification device capable of updating a verification failure history in a weighted manner according to the degree of similarity.

Moreover, the verification process in the IC card of this embodiment can be realized in the card of ISO conformity, and the IC card processing unit 2 can be realized by a general-purpose card reader writer. Moreover, according to the verification process of this embodiment, when the verification result of which degree of similarity is comparatively low is obtained, a verification retry is refused while the number of times of rewriting of the nonvolatile memory 13 is small. It is advantageous also in the viewpoint of memory use because the nonvolatile memory 13 has an upper limit (limit) in the number of times of rewriting.

It should be noted that the above-described verification process can be executed by software. For this reason, the above process can be realized by the IC card 1 that has the program memory 11 storing a program for executing procedure of the above process. Alternatively, it is possible to realize the above process in the IC card 1 by the IC card processing device 2 transmitting a program for executing procedure of the above process to the IC card 1 and the IC card 1 storing the program transmitted. Alternatively, the above process can be realized in the server 4 by the server 4 storing a program for executing procedure of the above process.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC module comprising:
   a storage configured to store reference data;
   a receiver configured to receive check data; and
   a processor configured to detect a degree of similarity between the reference data and the check data;
   wherein the processor is configured to determine a verification success when the degree of similarity is equal to or larger than a first threshold value, and
   wherein the processor is configured to
      determine a verification failure when the degree of similarity is smaller than the first threshold value,
      update a cumulative number of times of failure by a first increment when a first condition is satisfied where the degree of similarity is smaller than the first threshold value and is equal to or larger than a second threshold value that is smaller than the first threshold value, and
      update the cumulative number of times of failure by a second increment that is larger than the first increment when a second condition is satisfied where the degree of similarity is smaller than the second threshold value.

2. The IC module according to claim 1, wherein the cumulative number of times of failure is a number of times of the verification failure.

3. The IC module according to claim 2, wherein
the processor is configured to
- add a first value to the number of times of the verification failure when the first condition is satisfied, and
- add a second value to the number of times of the verification failure when the second condition is satisfied.

4. The IC module according to claim 1, wherein
the storage is configured to store a retry condition, and
the processor
- permits a verification retry when the retry condition is satisfied on the basis of the cumulative number of times of failure, and
- refuses the verification retry when the retry condition is not satisfied.

5. The module according to claim 2, wherein
the storage stores an upper limit of the number of times of the verification failure, and
the processor
- permits a verification retry when the number of times of the verification failure is equal to or smaller than the upper limit of the number of times of the verification failure, and
- refuses the verification retry when the number of times of the verification failure exceeds the upper limit of the number of times of the verification failure.

6. The IC module according to a claim 1, wherein
the processor resets the cumulative number of times of failure on the basis of the verification success.

7. The IC module according to claim 1, wherein
the reference data and the check data are data generated based on biometric information, respectively.

8. An IC card comprising:
the IC module as recited in claim 1.

9. A verification device comprising:
an IC processor; and
an IC module connected to the IC processor, the IC module comprising:
- a storage configured to store reference data;
- a receiver configured to receive check data; and
- a processor configured to detect a degree of similarity between the reference data and the check data;
wherein the processor is configured to
- determine a verification success when the degree of similarity is equal to or larger than a first threshold value, and
wherein the processor is configured to
- determine a verification failure when the degree of similarity is smaller than the first threshold value,
- update a cumulative number of times of failure by a first increment when a first condition is satisfied where the degree of similarity is smaller than the first threshold value and is equal to or larger than a second threshold value that is smaller than the first threshold, and
- update the cumulative number of times of failure by a second increment that is larger than the first increment when a second condition is satisfied where the degree of similarity is smaller than the second threshold value.

* * * * *